June 19, 1923.

G. BENNIE

SYSTEM OF AERIAL TRANSPORT

Filed April 9, 1923

1,459,495

2 Sheets-Sheet 2

Inventor
G. Bennie

Patented June 19, 1923.

1,459,495

UNITED STATES PATENT OFFICE.

GEORGE BENNIE, OF BUTE, SCOTLAND.

SYSTEM OF AERIAL TRANSPORT.

Application filed April 9, 1923. Serial No. 630,881.

*To all whom it may concern:*

Be it known that I, GEORGE BENNIE, a subject of the King of Great Britain and Ireland, residing at Normanhurst, Craigmore, Bute, Scotland, have invented a certain new and useful System of Aerial Transport, of which the following is a specification.

This invention relates to a system of transport of the kind in which a vehicle or the like is driven by an air propeller or the like along a rigid trackway.

According to the invention a vehicle or the like driven by an air propeller or the like is accommodated between two or more rigid guiding tracks at least one of which serves for the suspension of the said vehicle, means being provided for lifting the latter when the speed has been sufficiently increased, the weight of the vehicle being then wholly supported by the air or partly by the latter and partly by the supporting guiding track.

Figure 1:
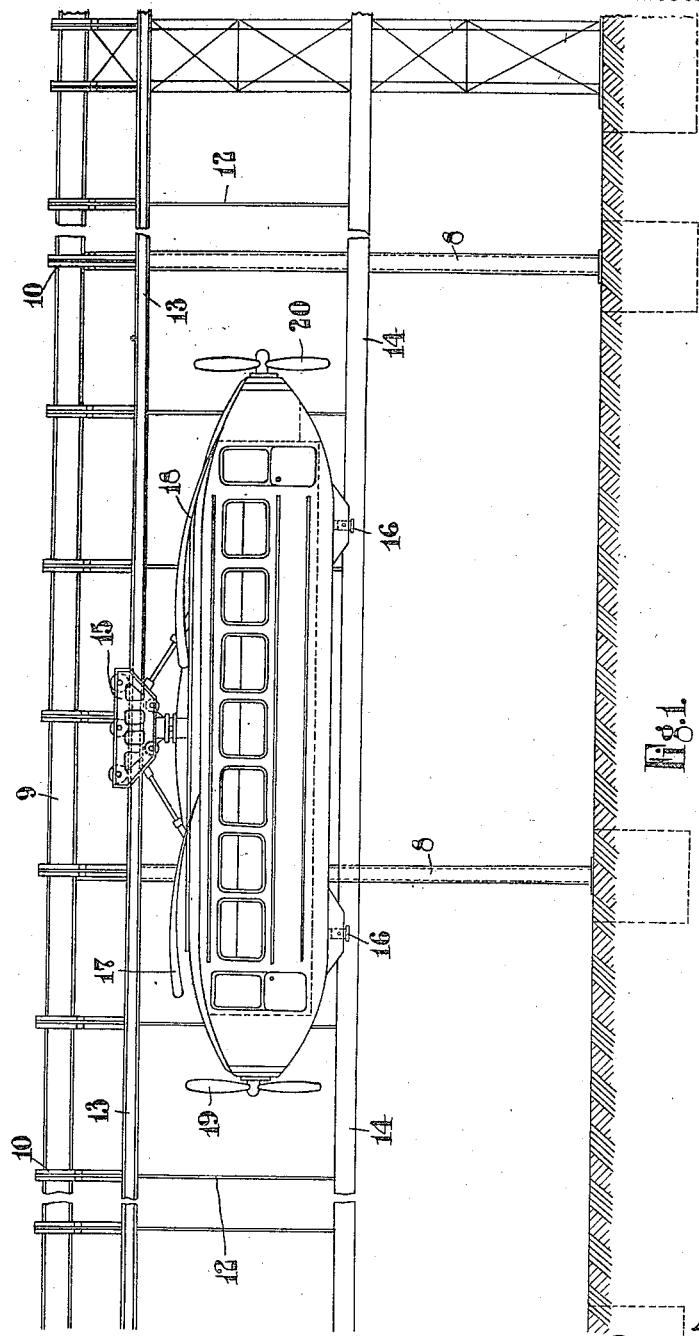

The invention is illustrated diagrammatically and by way of example in the accompanying drawings in which:

Figure 1 is an elevation and

Figure 2:
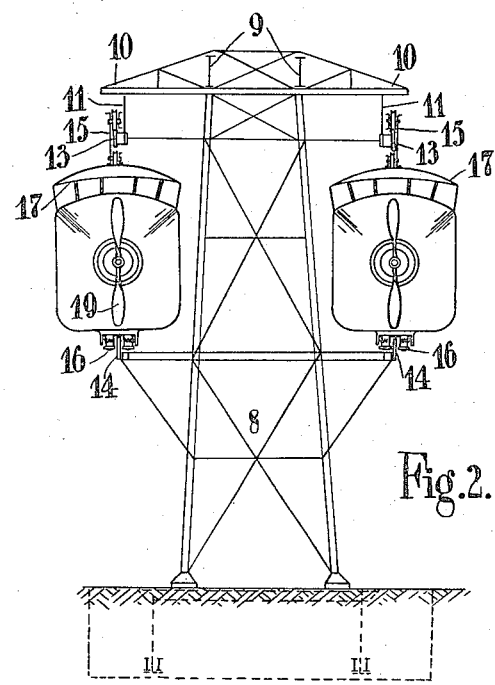

Figure 2 an end view of an installation suitable for the transport of passengers and freight on an endless track in two opposite directions.

Referring to the drawings, 8 designates a series of standards suitably spaced along the track, preferably at a distance from one another which is smaller than the length of the vehicle; 9 a pair of main girders supported on the standards 8; 10 cantilevers provided at intervals along the main girders 9; 11 and 12 brackets attached to the cantilevers and carrying horizontally braced suspended rails 13 and horizontally braced guide rails 14.

The vehicle is suspended from the main supporting rail 13 by means of a bogey or bogeys 15 and is provided with spring-controlled guide wheels or pulleys 16 which engage laterally with the guide rail 14 below the car. The vehicle is preferably also provided with lifting planes 17, 18, which are preferably arranged above the roof thereof, the width of which planes in the example illustrated is made approximately the same as the width of the vehicle, in order that the lateral overall dimensions of the installation may be maintained within reasonable limits. The lifting planes are so constructed and arranged that they can be reversed or otherwise adjusted to enable the craft to be driven in either direction.

The vehicle or aircraft hereinbefore referred to is driven along by means of air propellers 19, 20 which may be rotated by any suitable motors, such as internal combustion engines or electric motors, preferably provided at each end of the vehicle and connected with the air propellers by means of suitable clutches. When the air propellers are driven by means of electric motors the latter may receive their energy from a conductor suspended along the track, through a suitable collector provided on the vehicle the installation being earthed through the body of the vehicle and the standards. If one of the rails is suitably insulated from the remainder of installation, the same may be used instead of the cable for supplying the electric energy to the electric motors. Any other form of supplying electric energy from a distant generator station may be employed, care being taken in all cases that when the vehicle or aircraft slightly rises with increasing speed, a good electric contact is maintained between the live conductor and the collector.

When at rest, the entire weight of the craft is carried by the rail 13 from which it is suspended. In operation the air propeller 19 or 20, depending upon the direction in which the craft is to be propelled, is connected, by means of its clutch, with its associated engine or electric motor and the latter started. As the speed of the craft increases, the weight of same is gradually transferred from the rail 13 to the planes 17, 18 or their equivalent until, in the case of a craft designed to be wholly air-borne, flying speed is attained and the entire weight is taken by the planes or their equivalent or in the case of a craft designed to be only partially air-borne, the speed at which the greatest lifting effort is exerted is attained, when a predetermined proportion of the weight is removed from the rail 13. In the case of craft designed to be wholly air-borne any tendency of same to rise can be overcome by adjustment of the planes. When it is desired to stop the craft, the engine driving the air propeller can be stopped or disconnected and the engine at the other end of the craft can be started and connected with its associated air propeller which, tending to propel the craft in the direction opposite to that in which it is travelling, speedily brings the same to rest. Suitable friction or other brakes may be provided for securing the craft when it is at rest.

In the case of excessive gradients the wheels of the bogeys may be driven in addition to the propellers. A rudder may be provided for guiding the car to any point or at any angle that may be necessary. This rudder may be controlled by the upper main supporting rail.

It is to be understood that I do not desire to be limited to lifting planes, as the body of the vehicle may for instance be so designed as to its stream lines that it may rise and be partly air-borne when the speed is sufficiently increased. The vehicle may also be provided with air fins by which it will be caused to lift when desired. These fins may be adjusted automatically or otherwise. It is also to be understood that in the system according to the present invention, the bogeys need not rise from the suspension rail, suitable springs being preferably interposed between the bogeys and the vehicle to allow the latter to rise without the bogeys leaving the rail. It will thus be seen that my system is a combination of the present railway and tramway system with the advantages gained by the aircraft transport.

What I claim is:—

1. A system of aerial transport comprising in combination a vehicle, a rigid track for the suspension and a rigid track for the guiding of the said vehicle, between which tracks the vehicle is accommodated, air propellers for driving the vehicle and means capable of lifting the vehicle at a high speed of the latter, whereby the weight of the vehicle is wholly supported by the air or partly by the air and partly by the suspension track.

2. A system of aerial transport comprising in combination a vehicle, a rigid track for the suspension and a rigid track for the guiding of the said vehicle, between which tracks the vehicle is accommodated, air propellers for driving the vehicle and planes for lifting the vehicle at a high speed of the latter, whereby the weight of the vehicle is wholly supported by the said planes or partly by the planes and partly by the suspension track.

3. A system of aerial transport comprising in combination a vehicle, a rigid track for the suspension and a rigid track for the guiding of the said vehicle, between which tracks the vehicle is accommodated, air propellers for driving the vehicle and fins on the vehicle for causing the vehicle to lift when it reaches a sufficiently high speed.

4. A system of aerial transport as claimed in claim 1 comprising means permitting a reversal of the direction of travel of the vehicle.

In testimony whereof I have signed my name to this specification.

GEO. BENNIE.